Oct. 28, 1969   H. W. GERLACH   3,475,583
CORNER SEAL FOR QUICK OPENING ELECTRON BEAM WELDING CHAMBER
Filed Jan. 6, 1967

INVENTOR
HAROLD W. GERLACH
BY
Howard J Barnett
Attorney

United States Patent Office 3,475,583
Patented Oct. 28, 1969

---

3,475,583
CORNER SEAL FOR QUICK OPENING ELECTRON BEAM WELDING CHAMBER
Harold W. Gerlach, Milwaukee, Wis., assignor to A. O. Smith Corporation, Milwaukee, Wis., a corporation of New York
Filed Jan. 6, 1967, Ser. No. 607,778
Int. Cl. B23k 9/00
U.S. Cl. 219—121                           1 Claim

ABSTRACT OF THE DISCLOSURE

A corner seal for a quick opening electron beam welding chamber, and more particularly, a supplementary sealing element which effectively prevents any leakage at the intersecting edge of a workpiece and the opposed sealing members of a split chamber of a quick opening electron beam welding chamber which only partially encloses the workpiece.

BACKGROUND OF THE INVENTION

In many potential electron beam welding applications, it is impractical to provide a welding chamber to enclose an entire workpiece because of its large size. Various proposals have been made to adapt the electron beam process to the welding of large workpieces. One method attempts welding under atmospheric conditions. This system is faced with the problems of oxidation, weld porosity and large power losses due to beam scattering.

Another approach is described in U.S. Patents 3,136,882 and 3,136,833, issued Jan. 9, 1964 to E. W. Radtke. These patents propose enclosing only a portion of the workpiece in an evacuated enclosure. These devices, however, contemplate an extremely large workpiece, such as a tubular member and also employ a traveling electron beam gun. The apparatus in Patent 3,136,883 includes a long slot along which the beam generating means slides. The slot is sealed both ahead and behind the beam generator as it moves. Radtke Patent 3,136,882 also proposes moving the beam generator along a sealed slot. The slot is sealed ahead of the beam generator with a vacuum-tight tape, and after the beam has passed by, the slot is sealed with a lip seal.

SUMMARY OF THE INVENTION

This invention is directed to the sealing system for a quick opening electron beam welding chamber which incorporates an auxiliary sealing element at each corner where the workpiece protrudes out of the welding chamber. An elastomer seal material, such as a polyurethane having a durometer of 55–60 is successfully employed in small block-shaped members to fill and seal the critical corner areas. With the corner seals in use, it is possible to pump down the vacuum chamber to the acceptable welding vacuum reading of 100 microns from atmospheric pressure in about three seconds. The seals of this invention are particularly durable, even when subjected to repeated opening and closings associated with high volume production welding.

Applicant's invention avoids all the problems which are inherent in a traveling seal arrangement by providing a stationary beam generator *and* a stationary workpiece. The electron beam welding chamber is designed to split open and enclose only a portion of the workpiece, much as a mastiff encloses only a portion of a large bone in its jaw.

The electron beam is then magnetically deflected to obtain the required traverse of the beam over the workpiece to effect the weld. Applicant, however, had difficulty in obtaining an effective vacuum-tight seal at the intersection between the edge of the workpiece and the opposing seal lips of the split opening of the welding chamber. This problem was solved by the provision of the corner seals of the invention.

DESCRIPTION OF THE PREFERRED EMBODIMENT

Figure 1:
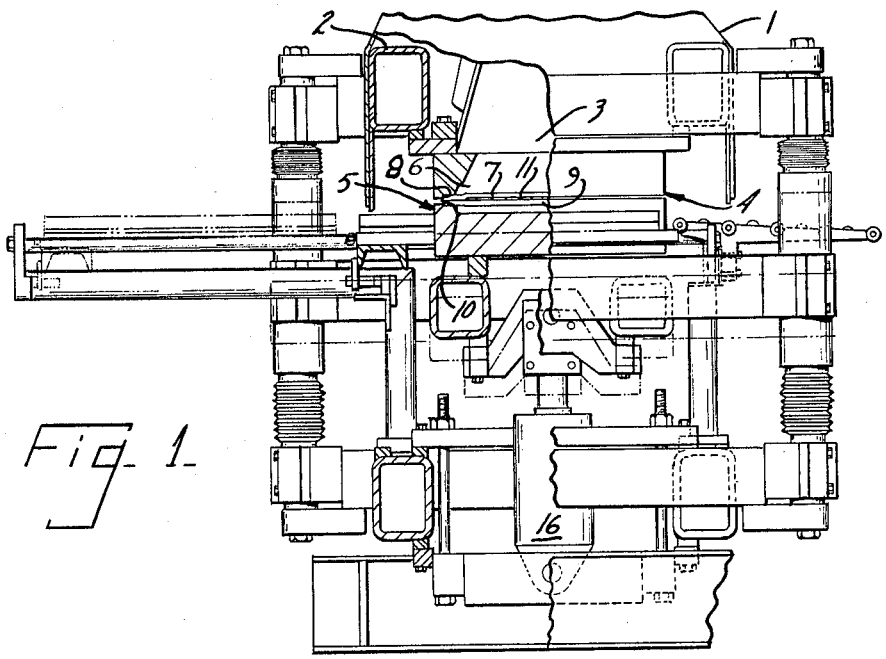
FIGURE 1 is a transverse sectional view with parts broken away showing the welding apparatus showing the location of the seals.
Figure 2:
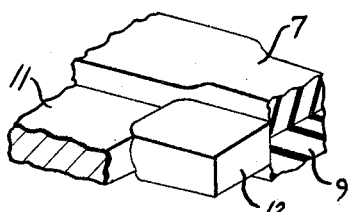
FIG. 2 is an enlarged detailed perspective schematic view with parts broken away showing one of the corner seals in sealing engagement.

As shown in the drawings, the welding apparatus includes an electron beam gun assembly 1, supported on a housing 2, which includes a welding chamber 3 comprising a stationary upper shell 4 and a movable, complementary shell 5. The shell 4 includes an opening 6 in the bottom thereof which is provided with an elastomer vacuum sealing lip 7 extending peripherally around the edge 8 thereof.

The complementary shell 5 is adapted to move into engagement with the stationary upper shell 4 and has a compelmentary sealing lip 9 disposed peripherally around edge 10 thereof. The sealing lips 7 and 9 engage when the shells 4 and 5 come together to form the single welding chamber 3. A workpiece 11 is disposed transversely across the sealing lips 7 and 9, and when the shells 4 and 5 are closed together, the portion of the workpiece 11 to be welded is disposed inside the welding chamber 3.

As shown in FIGS. 2–5, a plurality of corner seals 12 are provided at the intersections of the workpiece 11 and the sealing lips 7 and 9. The corner seals 12 are mounted between complementary seal clamps 13 and 14 respectively which are extensions of the upper and lower shells 4 and 5 respectively, which also serve to locate and retain the sealing lips 7 and 9.

Figure 3:
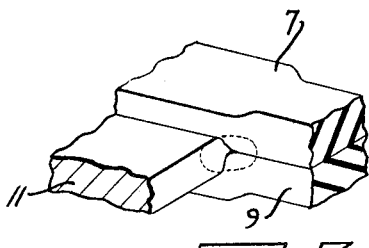
FIG. 3 is a view similar to FIG. 2, but with the corner seal not shown, and the area of its contact with the workpiece and the seal members indicated by cross-hatching.
Figure 4:
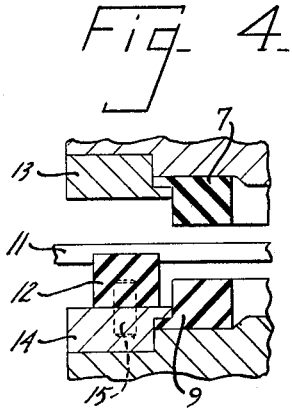
FIG. 4 is a sectional view of the seal and the corner seal at the intersecting corner with the workpiece prior to closing and sealing of the welding chamber with the workpiece in place.
Figure 5:
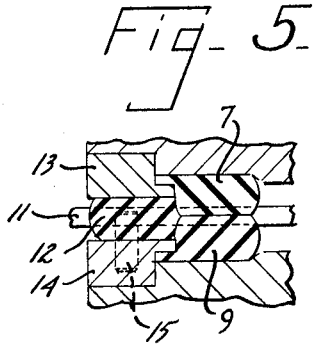
FIG. 5 is also a sectional view of the portion seal and the corner seal shown in FIG. 4 with the welding chamber closed, the seals engaged and the workpiece in position for welding.
Figure 6:
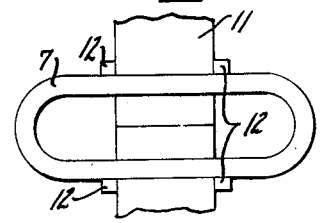
FIG. 6 is a schematic top plan view of the sealing system showing the locations of the corner seals.

FIG. 3 shows most clearly the important function of the corner seals. Especially in applications where rapid pumpdown time is required and repeated cyclical openings and resealings are required.

As can be seen, the workpiece 11, extending out through the sealing lips 7 and 9, creates a gap between the sealing lips 7 and 9 which it would be impractical to close in any other way, and which must be closed in order to pump the welding chamber 3 down to the proper vacuum for welding.

The corner seals 12 are each held in position on the lower seal clamp 14 by means of small protuberances 15. When the workpiece 11 is positioned in relation to the chamber 3 and the shells 4 and 5 are moved together, the corner seals 12 compress sufficiently to effectively seal a portion of the workpiece 11 in the chamber 3.

The shell 5 is provided with a hydraulic drive assembly 16 which makes possible the quick opening and closing thereof, which permits a high production welding rate because the corner seals 12 insure that a vacuum-tight chamber is established immediately after every closing together of the shells 4 and 5.

Various modes of carrying out the invention are contemplated as being within the scope of the following claims particularly pointing out and distinctly claiming the subject matter which is regarded as the invention.

I claim:

1. In an electron beam welding apparatus having a welding chamber comprising first and second complementary shell members adapted to grip and hold a portion of an elongated workpiece to be welded therebetween with a second portion of the workpiece extending outwardly from between the shell members, a first sealing lip disposed peripherally around the edge of the first shell member, a second complementary sealing lip disposed peripherally around the edge of the second shell member, said first and second sealing lips being adatped to engage each other and the workpiece adjacent an end of the shell members where the workpiece extends outwardly from the shell members, corner seals disposed in engagement with the workpiece and the sealing lips at the intersection of the longitudinal edge of the workpiece and the opposing sealing lips to fill and seal the opening therebetween created by the stock thickness of the workpiece when the shell members are moved relatively toward each other to seal a portion of the workpiece therebetween, and clamping means assoicated with the shell members to clamp the corner seals therebetween and to said workpiece when the shell members are moved together.

References Cited

UNITED STATES PATENTS 3,264,004   8/1966   Sciaky.
3,301,993   1/1967   Boyd et al.

JOSEPH V. TRUHE, Primary Examiner

W. DEXTER BROOKS, Assistant Examiner